(12) United States Patent
Van Der Meer et al.

(10) Patent No.: US 6,302,448 B1
(45) Date of Patent: Oct. 16, 2001

(54) COUPLING UNIT FOR MEMBRANE ELEMENTS

(75) Inventors: Walterus Gijsbertus Joseph Van Der Meer, Sneek; Wilhelmus Cornelis Van Paassen, Boxtel; Petrus Jacob De Moel, Hoevelaken, all of (NL)

(73) Assignees: N. V. Waterleiding Friesland, Leeuwarden; N. V. Waterleidingmaatschappij Oost-Brabant, S-Hertogenbosch, both of (NL)

(*) Notice: Subject to any disclaimer, the term of this patent is extended or adjusted under 35 U.S.C. 154(b) by 0 days.

(21) Appl. No.: 09/215,750

(22) Filed: Dec. 18, 1998

(30) Foreign Application Priority Data

Dec. 24, 1997 (NL) ...................................... 1007899

(51) Int. Cl.⁷ ...................................... F16L 17/00
(52) U.S. Cl. .................................. 285/123.15; 285/123.1; 285/371
(58) Field of Search .......................... 285/123.1, 123.15, 285/371, 398, FOR 113, FOR 120, 369

(56) References Cited

U.S. PATENT DOCUMENTS

| | | | |
|---|---|---|---|
| 3,246,920 | * | 4/1966 | Pall . |
| 3,722,694 | * | 3/1973 | Agranat . |
| 4,786,088 | * | 11/1988 | Ziu . |
| 5,034,125 | * | 7/1991 | Karachsch et al. . |
| 5,141,261 | * | 8/1992 | Ziu . |
| 5,456,502 | * | 10/1995 | Sharp . |
| 5,547,231 | * | 8/1996 | Sharp . |

FOREIGN PATENT DOCUMENTS

| | | | |
|---|---|---|---|
| 228017 | * | 6/1963 | (AT) ............................ 285/FOR 113 |
| 0 383 146 B1 | | 12/1993 | (EP) . |
| 91/14498 | | 10/1991 | (WO) . |
| 93/23152 | | 11/1993 | (WO) . |

* cited by examiner

*Primary Examiner*—Teri Pham Luu
(74) *Attorney, Agent, or Firm*—Jeffrey D. Myers

(57) ABSTRACT

The invention relates to a coupling unit for coupling two tubular membrane elements of the kind used in membrane filter technology, forming extensions of one another. The coupling unit comprises a jacket piece which is provided at both its ends with sealing surfaces intended to engage the facing ends of the membrane elements to be coupled thereto. The sealing surfaces may be formed on the interior peripheral wall of the jacket piece to engage the exterior peripheral wall of the ends of the membrane elements. However, the sealing surfaces may also be formed on the cross-cut end surfaces of the jacket piece, and engage the cross cut end walls of the membrane elements. The interior of the jacket piece may comprise an axially extending conduit portion to communicate with corresponding flow conduits in the membrane elements.

12 Claims, 2 Drawing Sheets

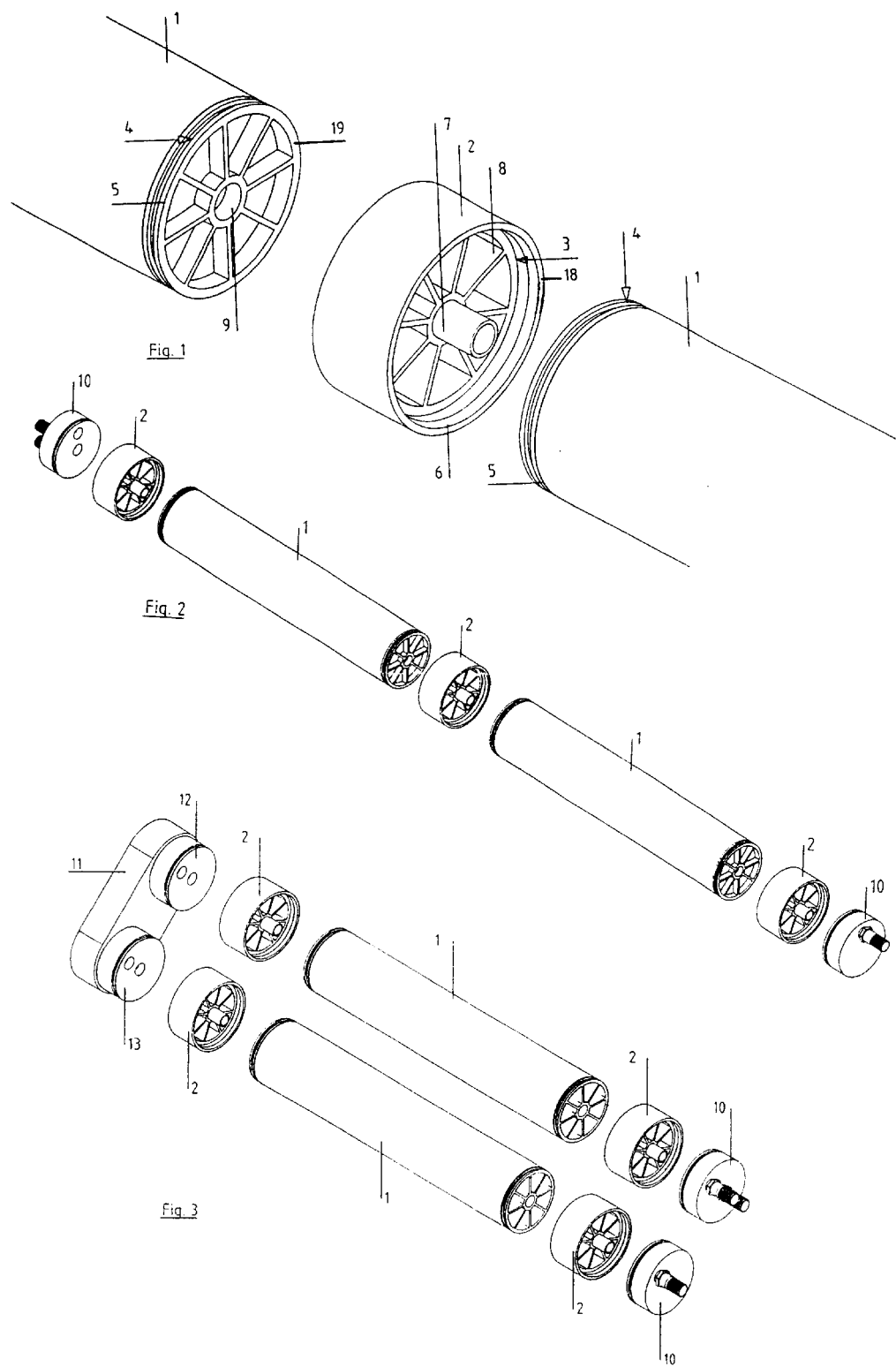

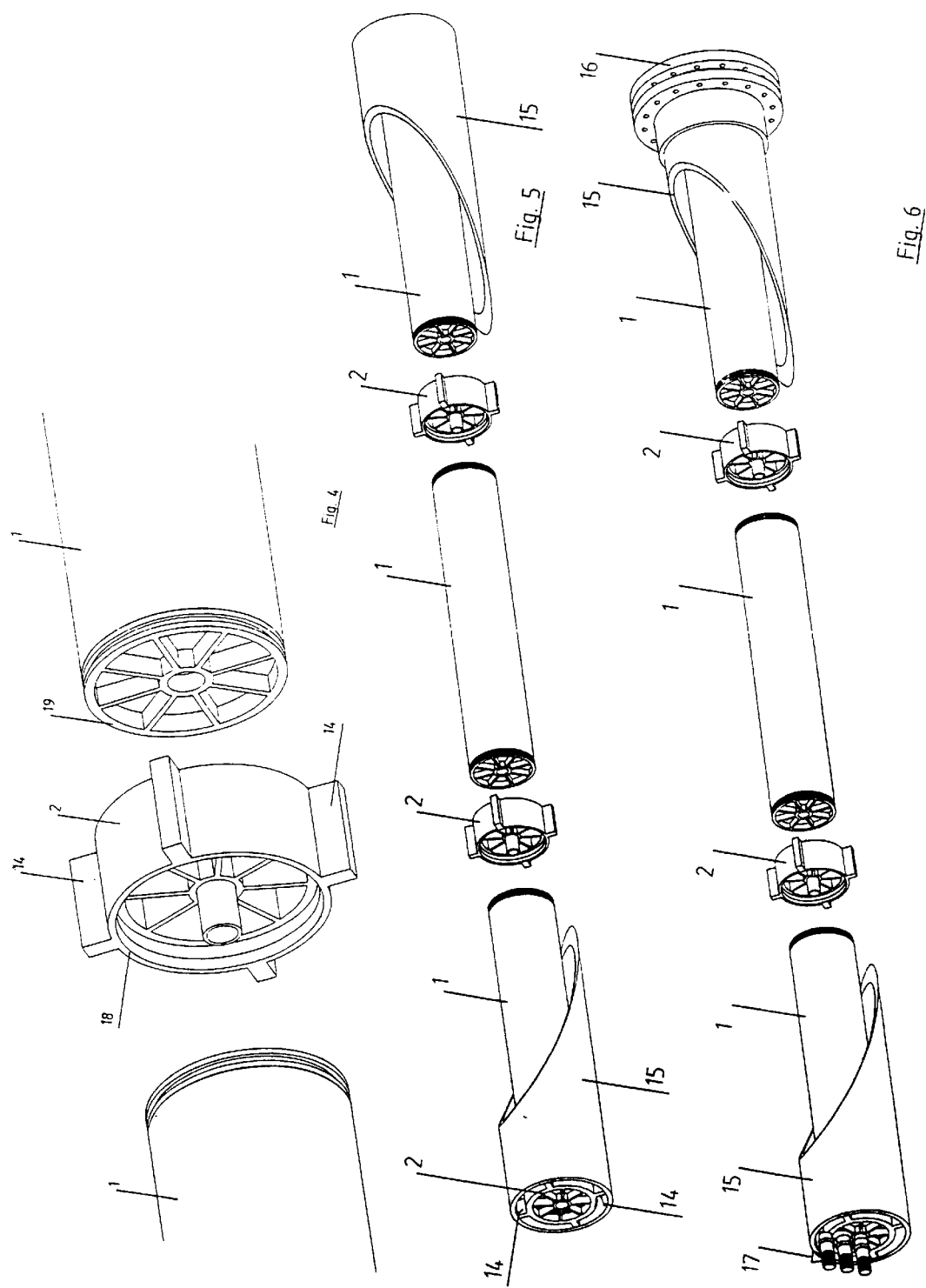

COUPLING UNIT FOR MEMBRANE ELEMENTS

BACKGROUND OF THE INVENTION

The invention relates to a coupling unit for coupling two tubular membrane elements of a kind applied in membrane filter technology, which membrane elements form extensions of one another.

As is probably known, membrane filtration is a separation technique in which liquids and gasses are separated with the aid of membrane elements. Some of the substances are retained and the rest of the substances pass through the membrane. Thus, a feed stream to be purified is divided into a purified production stream and a concentrate stream.

In a known membrane filter technique a plurality of membrane elements is connected in series and placed into a tubular pressure vessel. The pressure vessel fits closely around the membrane elements, with sealing rings provided between the membrane elements and the pressure vessel. The membrane elements and the pressure vessel thus form an assembled unit.

SUMMARY OF THE INVENTION

The object of the invention is to provide a coupling unit for such membrane elements, by which means it becomes possible to couple membrane elements without being obliged to employ such a pressure vessel.

To this end the coupling unit according to the invention is characterized by a jacket piece, which is provided at both its ends with sealing surfaces intended to engage the facing ends of the membrane elements to be coupled thereto.

With the aid of the jacket piece according to the invention the membrane elements are coupled together both in the flow-technical and in the constructive sense. With low-pressure applications the above-mentioned pressure vessel may be omitted altogether. However, if a pressure vessel is employed, the membrane elements and the pressure vessel form independent parts of the installation. This provides the possibility of manufacturing the membrane elements and the pressure vessel independently of each other, using different measurements and having a free choice of material. It also allows the pressure vessel to serve as conveyor pipeline for one of the streams.

In accordance with one preferred embodiment of the coupling unit, the sealing surfaces are formed on the interior peripheral wall of the jacket piece and are designed to engage the exterior peripheral wall of the ends of the membrane elements, with the inside diameter of the jacket piece being, at least at the ends, slightly larger than the outside diameter of the ends of the engaging membrane elements.

In this embodiment the coupling unit, as it were, engages around the ends of the membrane elements to be coupled. The difference between the inside diameter of the jacket piece and the outside diameter of the ends of the membrane elements is selected such as to obtain the desired fit. For example, if a coupling has to be pull-resistant the fit will be tighter than when such a coupling is not required to be pull-resistant.

Although the ends of the jacket piece could conceivably be provided with a step-like diameter increase in order to enable them to engage around the membrane elements, constructionally it is preferred that said inside diameter of the jacket piece is the same over its total length. In this manner an uncomplicated jacket piece is obtained whose manufacture is simple.

Another embodiment provides a coupling unit whose sealing surfaces are formed on the cross-cut end surfaces of the jacket piece, and are designed to engage the facing cross-cut end walls of the membrane elements. In such a case the cross-cut end surfaces of the jacket piece and the cross-cut end walls of the membrane elements are pushed together tightly by additional means.

Irrespective of which embodiment is adopted, it is further preferred that the sealing surfaces are provided with means such as sealing rings, surface profiling, and the like, to promote the efficacy seal and/or the engagement. The sealing rings may, for example, be admitted into peripheral grooves in the jacket piece to engage appropriate surface profiling on the membrane elements. Naturally, the reverse is also possible, with sealing rings being provided on the membrane elements and the jacket piece possessing surface profiling.

As a particular form of surface profiling thread could be mentioned, by means of which the jacket piece can be screwed onto the end of the membrane elements.

One particular embodiment of the coupling unit mentioned is characterized by at least one axially extending conduit portion located in the interior of the jacket piece, designed to have its two ends communicate with corresponding flow conduits in the membrane elements. When two membrane elements are coupled with the aid of said coupling unit, the conduit portion ensures that with respect to flow, corresponding flow conduits in the various membrane elements are in communication.

In this context it is preferred that the outside diameter of the conduit portion is slightly smaller than the inside diameter of said flow conduits in the membrane elements. This allows the ends of the conduit portion to be inserted into said flow conduits to form a sealing connection between the conduit portion and said flow conduits.

In this connection it is further advantageous if the conduit portion extends in the axial direction past the ends of the jacket piece. In this manner the overlap between the conduit portion and the flow conduits suffices to minimize the possibility of leakage.

A constructionally simple embodiment of such a variant of the coupling unit may be obtained by joining the conduit to the jacket piece by means of substantially radially extending spoke portions.

As already mentioned above, it is possible with the aid of the coupling unit according to the invention, to employ coupled membrane elements in combination with a pressure vessel known as such. In such a case it is preferred to provide the exterior periphery of the jacket piece with spacer studs. With the aid of said spacer studs it becomes simple to centre the coupling unit, and accordingly, the membrane elements in the interior of the pressure vessel.

Since in such a case the pressure vessel generally also acts as conveyor pipeline for one of the streams, it is advantageous to distribute the spacer studs evenly and in the axial direction over the periphery of the jacket piece. In this way they will form no impediment to said stream.

Naturally it is also possible to have more than one conduit portion inside the jacket piece of the coupling unit. In a general one could say that the embodiment of the coupling unit strongly depends on the design of the membrane elements to be coupled.

Hereinbelow the invention will be explained in more detail with reference to the drawings which illustrate a number of embodiments of the coupling unit according to the invention.

Other objects, advantages and novel features, and further scope of applicability of the present invention will be set fourth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 shows in perspective a first embodiment of the coupling unit according to the invention;

FIG. 2 shows an application of the coupling unit shown in FIG. 1;

FIG. 3 shows another application of the coupling unit of FIG. 1;

FIG. 4 shows in perspective a second embodiment of the coupling unit according to the invention;

FIG. 5 shows an application of the coupling unit according to FIG. 4, and

FIG. 6 shows a second application of the coupling unit according to FIG. 4.

DESCRIPTION OF THE PREFERRED EMBODIMENTS

BEST MODES FOR CARRYING OUT THE INVENTION

The coupling unit shown in the figures serves for coupling two tubular membrane elements as used in membrane filter technology, such that they form extensions of one another. Membrane elements of this kind are known as such, and require no further explanation.

The coupling unit substantially comprises a jacket piece 2. Said jacket piece 2 is provided at both its ends with sealing surfaces. FIG. 1 shows such a sealing surface at the right end of the jacket piece 2, indicated with number 3. This sealing surface is formed on the interior peripheral wall of the jacket piece 2. Similarly, such a same sealing surface is provided at the opposite, not visible end of the jacket piece 2.

The sealing surface 3 is designed to engage the exterior peripheral wall 4 of the ends of the membrane elements 1. For this purpose the inside diameter of the end of the jacket piece 2 is slightly larger than the outside diameter of the membrane elements. The difference between the diameters depends on the desired fit.

In the embodiment shown in FIG. 1 the end of the membrane elements 1 is provided with a sealing ring 5 fitting into a peripheral groove. The sealing surface 3 of the jacket piece 2 is provided with a surface profile 6 which, when the jacket piece 2 is assembled with a membrane element 1, very effectively engages the sealing ring 5.

The jacket piece 2 of the embodiment show in FIG. 1 is cylindrical, and has the same diameter over its entire length. However, another possibility is to reduce the diameter over a central portion of the jacket piece 2, while increasing its diameter only at the ends in order to allow the ends of the membrane elements to be fitted.

The interior of the jacket piece 3 comprises a conduit portion 7, extending in an axial direction. The conduit portion 7 is joined with the jacket piece 2 by means of substantially radially extending spoke portion 8.

In the embodiment shown in conduit portion 7 extends axially past the ends of the jacket piece 2. When the coupling unit is positioned between two adjacent membrane elements, the conduit portion 7 connects to corresponding flow conduits 9 provided in the membrane elements. In general, the outside diameter of the conduit portion 7 will be slightly smaller than the inside diameter of said flow conduits 9, so that an optimal connection between conduit portion 7 and flow conduits 9 can be obtained. This means that the coupling unit, in addition to connecting the membrane elements, also provides the communication between the flow conduits formed therein. Of course, contrary to what is shown in FIG. 1, there may be more than one conduit portion.

FIGS. 2 and 3 show two examples of application of the coupling unit shown in FIG. 1. It should be noted that these figures, as well as FIG. 1, show an enlarged view of the entire assembly.

FIG. 2 two membrane elements 1 are positioned in one another's extension and are coupled by an intermediate jacket piece 2. The ends of the membrane elements 1 facing away from one another connect to two other jacket pieces 2, whose other ends connect with end caps 10. Such end caps provide, in a manner known in itself, for the inlet and outlet of the various streams.

In the embodiment shown in FIG. 3, the membrane elements to be coupled are, strictly speaking, no positioned in one another's extension. This is realized by means of a specially formed intermediate part 11, causing the reversal of the flow direction. However, the principle of this embodiment does not deviate from the concept of the invention, as the connecting branches 12 and 13 are comparable to the end of a membrane element. The ends of the membrane elements 1 facing away from the intermediate part 11 are connected to the end caps 10 by means of a jacket piece 2 in the manner shown in FIG. 2.

FIG. 4 shows an embodiment of the coupling unit which, broadly speaking, corresponds to the embodiment shown in FIG. 1. The difference is, that on the exterior periphery of the jacket piece 2 spacer studs 14 are provided. These spacer studs are distributed evenly and in the axial direction over the periphery of the jacket piece 2.

FIG. 5 shows that said spacer studs 14 facilitate the centring of the jacket piece 2 in the interior of a pressure vessel 15 which is known as such, thereby also centring the membrane elements 1 in the interior of said pressure vessel 15. In this manner the space between the outside diameter of the jacket piece 2 and the pressure vessel 15 can act as flow conduit. The embodiment shown in FIG. 6 possesses at one side of the pressure vessel 15 a closing plate or coupling flange 16. The opposite end of the pressure vessel 15 is provided with in- and outlet means 17 for the various streams.

The embodiments of the coupling unit described above possess the common feature that the ends of the jacket piece 2 always engage around the ends of the membrane elements. However, the cross-cut ends 18 of the jacket piece 2 could conceivably also engage the end walls 19 of the respective ends of the membrane elements 1.

The invention is not limited to the above-described embodiments, which may be modified in many ways while still remaining within the scope of the invention as specified in the appended claims.

What is claimed is:

1. A coupling unit for coupling two tubular membrane elements of a kind applied in membrane filter technology, which membrane elements form extensions of one another, said coupling unit comprising a jacket piece which is provided at both its ends with sealing surfaces engageable to facing ends of membrane elements, wherein sealing surfaces are formed on cross-cut end surfaces of the jacket piece, which sealing surfaces are engageable to facing cross-cut end walls of membrane elements.

2. A coupling unit in accordance with claim 1 wherein the sealing surfaces are formed on an interior peripheral wall of the jacket piece and are engageable to exterior peripheral walls of ends of membrane elements having an outside diameter slightly smaller than an inside diameter of the jacket piece at least at ends of the jacket piece.

3. A coupling unit in accordance with claim 2 wherein an inside diameter of the jacket piece is approximately the same over its total length.

4. A coupling unit in accordance with claim 1 wherein said sealing surfaces are provided with means from the group consisting of sealing rings and surface profiling to promote efficacy of seal.

5. A coupling unit in accordance with claim 1 wherein at least one axially extending conduit portion located inside the jacket piece has its two ends able to communicate with corresponding flow conduits in membrane elements.

6. A coupling unit in accordance with claim 5 wherein an outside diameter of the conduit portion is engageable to slightly larger inside diameter of corresponding flow conduits in membrane elements.

7. A coupling unit in accordance with claim 6 wherein the conduit portion extends in an axial direction past the ends of the jacket piece.

8. A coupling unit in accordance with claim 5 wherein said conduit portion is joined with the jacket piece by means of substantially radially extending spoke portions.

9. A coupling unit in accordance with claim 1 wherein an exterior periphery of the jacket piece is provided with spacer studs.

10. A coupling unit in accordance with claim 9 wherein said spacer studs are distributed substantially evenly and in an axial direction over a periphery of the jacket piece.

11. A coupling unit for coupling two tubular membrane elements of a kind applied in membrane filter technology, which membrane elements form extensions of one another, said coupling unit comprising a jacket piece which is provided at both its ends with sealing surfaces engageable to facing ends of membrane elements, wherein at least one axially extending conduit portion located inside the jacket piece has its two ends able to communicate with corresponding flow conduits in membrane elements.

12. A coupling unit for coupling two tubular membrane elements of a kind applied in membrane filter technology, which membrane elements form extension of one another, said coupling unit comprising a jacket piece which is provided at both its ends with sealing surfaces engageable to facing ends of membrane, wherein an exterior periphery of the jacket piece is provided with spacer studs.

* * * * *